(12) United States Patent
Hardman et al.

(10) Patent No.: US 12,509,977 B1
(45) Date of Patent: Dec. 30, 2025

(54) COUPLING LOW-PRESSURE MANIFOLD PASSAGES IN HYDRAULIC FRACTURING SYSTEMS

(71) Applicant: SPM Oil & Gas Inc., Fort Worth, TX (US)

(72) Inventors: Adam Stephen Hardman, Azle, TX (US); Ronald E. Arizpe, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 18/754,449

(22) Filed: Jun. 26, 2024

(51) Int. Cl.
| | |
|---|---|
| E21B 43/26 | (2006.01) |
| E21B 34/02 | (2006.01) |
| E21B 41/00 | (2006.01) |
| F16L 11/12 | (2006.01) |
| F16L 41/03 | (2006.01) |
| F16L 57/06 | (2006.01) |

(52) U.S. Cl.
CPC .......... *E21B 43/2607* (2020.05); *E21B 34/02* (2013.01); *E21B 41/00* (2013.01); *E21B 43/26* (2013.01); *F16L 11/12* (2013.01); *F16L 41/03* (2013.01); *F16L 57/06* (2013.01)

(58) Field of Classification Search
CPC ...... E21B 43/2607; E21B 43/26; E21B 34/02; E21B 41/00; F16L 11/12; F16L 57/06; F16L 41/03
USPC ........ 137/1; 166/269, 275, 375, 97.5, 242.2, 166/242.3
See application file for complete search history.

(56) References Cited

U.S. PATENT DOCUMENTS

| | | | |
|---|---|---|---|
| 9,518,430 B2 | 12/2016 | Guidry | |
| 9,568,138 B2* | 2/2017 | Arizpe | F16L 41/03 |
| 10,344,901 B2* | 7/2019 | Penney | E21B 34/02 |
| 10,480,300 B2 | 11/2019 | Guidry | |
| 10,768,642 B2* | 9/2020 | Bishop | G05D 16/04 |
| 11,085,266 B2* | 8/2021 | Thomeer | E21B 17/02 |
| 11,454,100 B1 | 9/2022 | Choate | |
| 11,885,207 B2 | 1/2024 | Garro et al. | |
| 2006/0180507 A1 | 8/2006 | DeHart et al. | |
| 2018/0187662 A1* | 7/2018 | Hill | F04B 47/02 |
| 2020/0300073 A1* | 9/2020 | Hinderliter | E21B 43/2607 |
| 2023/0243351 A1* | 8/2023 | Grimes | F04B 49/08 |
| | | | 417/44.2 |

(Continued)

FOREIGN PATENT DOCUMENTS

WO 2022256415 A1 12/2022

*Primary Examiner* — Minh Q Le

(57) ABSTRACT

A method for performing a hydraulic fracturing operation includes providing a manifold assembly. The manifold assembly has a low-pressure section with a first passage that receives a clean fluid and a second passage that receives a slurry. Each passage includes outlets to provide the clean fluid and the slurry to pumps. An outlet end of the first passage is coupled to an outlet end of the second passage via a flexible fluid coupler. A first valve is between outlets of the first passage, and a second valve is between outlets of the second passage. The manifold assembly has a high-pressure section with a third passage that receives the clean fluid and the slurry from the pumps. Further, the method includes controlling, based on an open or closed position of the first and second valves, whether each outlet, of the first and second passages, is provided with clean fluid or slurry.

20 Claims, 8 Drawing Sheets

(56) References Cited

U.S. PATENT DOCUMENTS

2024/0247742 A1\* 7/2024 Shirani .................. F16L 23/08
2025/0084745 A1\* 3/2025 Ripple ................ E21B 43/2607

\* cited by examiner

COUPLING LOW-PRESSURE MANIFOLD PASSAGES IN HYDRAULIC FRACTURING SYSTEMS

TECHNICAL FIELD

The present disclosure relates to manifold assemblies applied in hydraulic fracturing systems. More particularly, the present disclosure relates to a fluid coupler for fluidly coupling two low-pressure manifold passages of a manifold assembly for a hydraulic fracturing operation.

BACKGROUND

In oil or gas operations, hydraulic fracturing systems may be used to fracture a subterranean formation by conveying pressurized hydraulic fracturing fluid to a well bore traversing the subterranean formation. Hydraulic fracturing systems typically require several fluid lines, valves, pump equipment, and a manifold assembly, to deliver the fracturing fluid into the well bore. To this end, a manifold assembly may include a low-pressure section (e.g., one or more low-pressure lines) and a high-pressure section (e.g., one or more high-pressure lines). During operations, fluid is generally introduced into the low-pressure section and then further pumped into the high-pressure section, e.g., to form the fracturing fluid, which may then be delivered into the well bore.

It is common practice for site operators to introduce different types of the fluids into the low-pressure section. To this end, the low-pressure section may include multiple passages. A first fluid may be passed into a first passage of the low-pressure section, while a second fluid (e.g., different from the first fluid) may be passed into a second passage of the low-pressure section. A volume of any of the fluid (e.g., the first fluid) in any of the passages (e.g., the first passage) configured to be pumped into the high-pressure section is at best limited to a maximum volume delimited by that passage (e.g., the first passage).

U.S. Pat. No. 10,480,300 relates to a fracturing fluid delivery system. The system includes a fracturing manifold and a fracturing tree. A fluid conduit is coupled between the fracturing manifold and the fracturing tree to enable receipt of a fracturing fluid by the fracturing tree from the fracturing manifold through the fluid conduit. The fluid conduit includes rigid and flexible pipe segments coupled together to collectively provide a fluid connection from the fracturing manifold to the fracturing tree.

SUMMARY OF THE INVENTION

In one aspect, the disclosure is directed to a method for performing a hydraulic fracturing operation. The method includes providing a manifold assembly. The manifold assembly has a low-pressure section that includes a first passage that receives a clean fluid via a first inlet end and a second passage that receives a slurry via a second inlet end. The second passage is parallel to the first passage. Each of the first passage and the second passage includes side outlets configured to provide the clean fluid and the slurry, respectively, to a low-pressure section of hydraulic fracturing pumps. A first outlet end of the first passage is coupled to a second outlet end of the second passage via a flexible fluid coupler. Further, a first valve is between first and second side outlets of the first passage, and a second valve is between third and fourth side outlets of the second passage. The manifold assembly also has a high-pressure section that includes a third passage with side inlets that receive the clean fluid and the slurry, respectively, from a high-pressure section of the hydraulic fracturing pumps. The third passage is parallel to the first and second passages. Further, the method includes controlling, based on an open or closed position of the first and second valves, whether each side outlet, of the first and second passages, is provided with clean fluid or slurry.

In another aspect, the disclosure relates to a fluid coupler for fluidly coupling a first passage and a second passage respectively carrying a first fluid and a second fluid for a hydraulic fracturing operation. The fluid coupler includes a first conduit and a second conduit. Each of the first conduit and the second conduit defines a primary end and a secondary end. The primary end of the first conduit is configured to be connected to the first passage to selectively fluidly couple the first conduit with the first passage. The primary end of the second conduit is configured to be connected to the second passage to selectively fluidly couple the second conduit with the second passage. The fluid coupler further includes a connector conduit, a first coupler valve, and a second coupler valve. The connector conduit is fluidly coupled between the secondary end of the first conduit and the secondary end of the second conduit. The first coupler valve is positionable between the first passage and the primary end of the first conduit and the second coupler valve is positionable between the second passage and the primary end of the second conduit. In an open state of the first coupler valve and the second coupler valve, a fluid coupling between the first passage and the second passage is established by the fluid coupler. Also, in the open state of the first coupler valve and the second coupler valve, a transmission of one of the first fluid and the second fluid into at least a portion of the other of the first passage and the second passage is facilitated to selectively increase a quantity or a proportion of one of the first fluid or the second fluid within a fracturing fluid for the hydraulic fracturing operation.

In yet another aspect, the disclosure is directed to a manifold assembly for a hydraulic fracturing system. The manifold assembly includes a high-pressure section, a low-pressure section, and a fluid coupler. The low-pressure section includes a first passage and a second passage respectively carrying a first fluid and a second fluid. Each of first fluid and the second fluid is configured to be pumped into the high-pressure section to form a fracturing fluid, which is suppliable into a well bore for performing a hydraulic fracturing operation. The fluid coupler is applied for fluidly coupling the first passage and the second passage. The fluid coupler includes a first conduit and a second conduit. Each of the first conduit and the second conduit defines a primary end and a secondary end. The primary end of the first conduit is connected to the first passage to selectively fluidly couple the first conduit with the first passage. The primary end of the second conduit is connected to the second passage to selectively fluidly couple the second conduit with the second passage. Further, the fluid coupler includes a connector conduit fluidly coupled between the secondary end of the first conduit and the secondary end of the second conduit. Moreover, the fluid coupler includes a first coupler valve and a second coupler valve. The first coupler valve is positioned between the first passage and the primary end of the first conduit and the second coupler valve is positioned between the second passage and the primary end of the second conduit. In an open state of the first coupler valve and the second coupler valve, fluid coupling between the first passage and the second passage is established by the fluid coupler and a transmission of one of the first fluid and the second fluid into at least a portion of the other of the first passage and the second passage is facilitated to selectively increase a quantity or a proportion of one of the first fluid or the second fluid within the fracturing fluid for the hydraulic fracturing operation.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
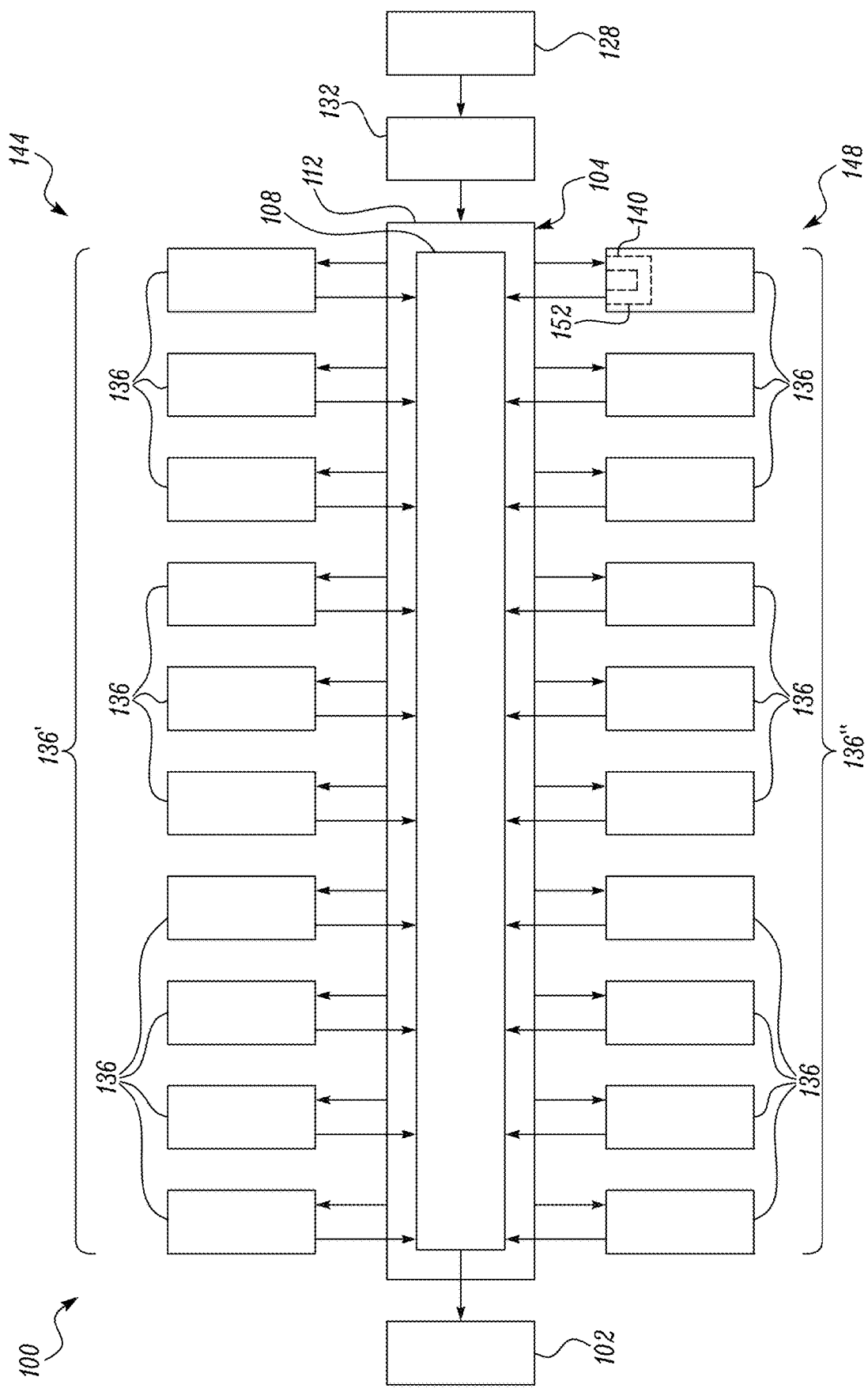
FIG. 1 is a schematic view of an exemplary hydraulic fracturing system having a manifold assembly, in accordance with an embodiment of the present disclosure.
Figure 2:
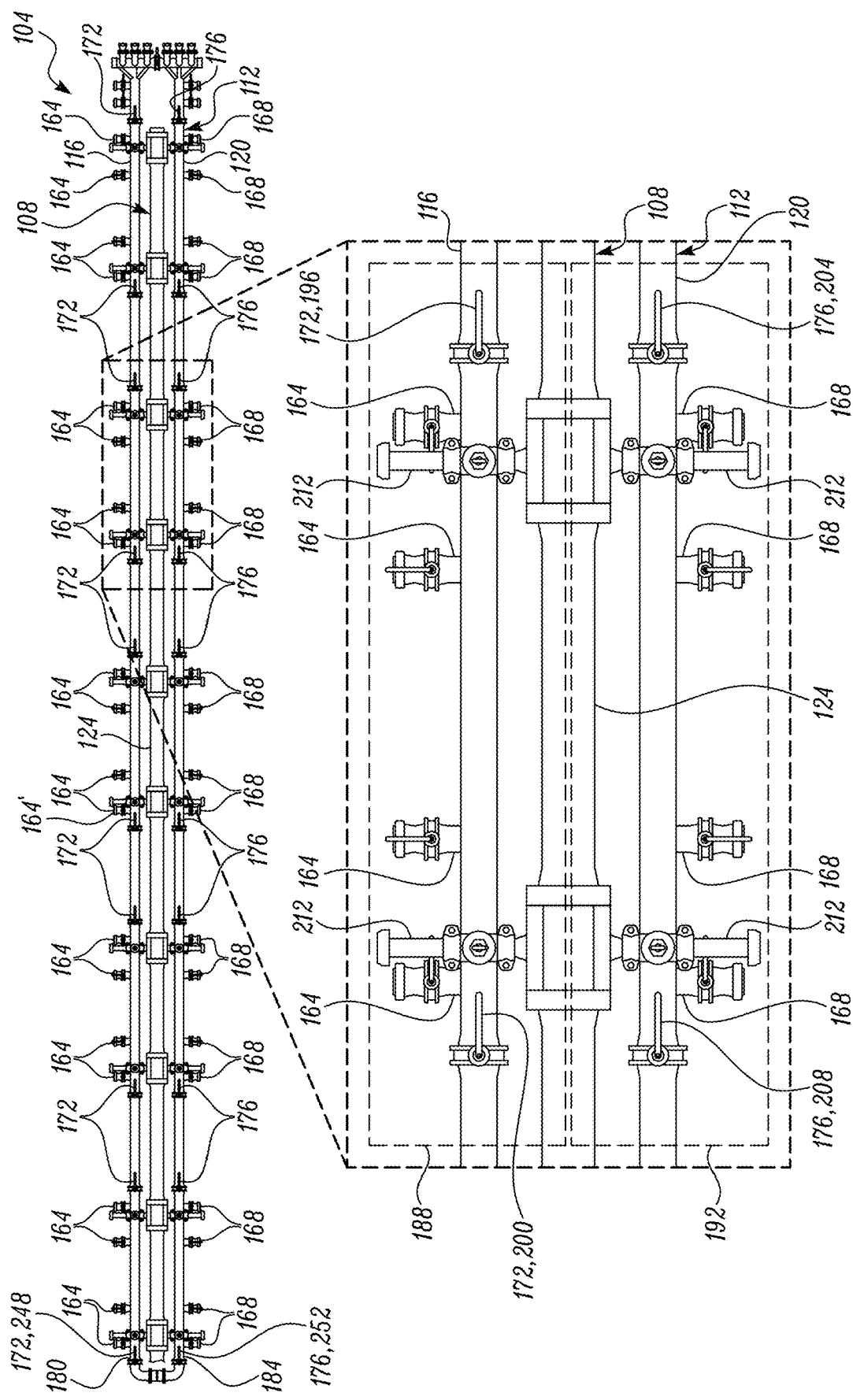
FIG. 2 is a plan view of the manifold assembly illustrating a low-pressure section and a high-pressure section of the manifold assembly, in accordance with an embodiment of the present disclosure.

Referring to FIG. 1, a hydraulic fracturing system 100 is described. The hydraulic fracturing system 100 may be used to perform a hydraulic fracturing operation, in which a fracturing fluid may be supplied into a subterranean formation (e.g., through a well bore 102) to fracture one or more parts of the subterranean formation. In so doing, cracks may be formed in those parts of the subterranean formation and accordingly oil and/or gas may be extracted therefrom. Although aspects of the present disclosure relate to the hydraulic fracturing system 100, it will be appreciated that the embodiments described herein are not limited to the hydraulic fracturing system 100 alone. Rather, said embodiments may be applied to any other system or process in which a pressurized fluid may be delivered into a subsurface location or a subterranean formation, e.g., through the well bore 102.

With continued reference to FIG. 1, and also in conjunction with FIGS. 2 through 5, the hydraulic fracturing system 100 may include a manifold assembly 104 to help convey a pressurized fracturing fluid into the parts of the subterranean formation. The manifold assembly 104 may include or define a (relatively) high-pressure section 108 and a (relatively) low-pressure section 112. Example pressures (e.g., fluid pressures) that may be applicable in the low-pressure section 112 may be below 8,000 pounds per square inch (psi), while example pressures (e.g., fluid pressures) that may be applicable in the high-pressure section 108 may be above 15,000 psi. It will be appreciated that these values are provided for illustrative purposes only and can include other values-such values may depend upon the type and/or area of application of the manifold assembly 104. Although not limited, the low-pressure section 112 may include a first passage 116 and a second passage 120, as shown in FIGS. 2 through 5, whereas the high-pressure section 108 may include one or more pressure channels (e.g., see pressure channel or a third passage 124), as shown in FIGS. 2 through 5.

A first fluid and a second fluid may be supplied into the manifold assembly 104 for performing the hydraulic fracturing operation. The first fluid may be different from the second fluid. For example, the first fluid may be a clean fluid while the second fluid may be a dirty fluid or may include a slurry. As an example, both the first fluid and the second fluid may be sourced from one or more reservoirs (e.g., see reservoir 128 in FIG. 1) of the hydraulic fracturing system 100. In some embodiments, the first fluid or the clean fluid may be directly supplied from the reservoir 128, while the second fluid may be formed by passing a fluid (e.g., a clean fluid such as the first fluid itself from the reservoir 128) and then mixing and blending said fluid with various materials in a blender 132 (see FIG. 1) of the hydraulic fracturing system 100. The various materials may include proppant, sand, and/or other additives, now known or in the future developed. By way of such mixing, the second fluid and/or the slurry may be formed, e.g., in the blender 132.

Both the first fluid and the second fluid may be supplied into the low-pressure section 112 of the manifold assembly 104 from where they may be further drawn into hydraulic fracturing pumps 136 or into low-pressure sections or low-pressure sides of the hydraulic fracturing pumps 136 (e.g., owing to a suction generated by the hydraulic fracturing pumps 136) (see in FIG. 1 a low-pressure side 140 schematically marked for one of the pumps 136). For ease in reference, the hydraulic fracturing pumps 136 may be simply referred to as pumps 136, hereinafter. Although not limited, the pumps 136 may be positioned on either sides of the manifold assembly 104—e.g., see in FIG. 1, a first pump set 136' positioned at a first side 144 (e.g., a left side) of the manifold assembly 104 and a second pump set 136" positioned at a second side 148 (e.g., a right side) of the manifold assembly 104. The pumps 136 may pressurize the inflowing first fluid and the inflowing second fluid and accordingly may pump and/or supply (e.g., from high-pressure sections or from high-pressure sides of the pumps 136) (see in FIG. 1 a high-pressure side 152 schematically marked for one of the pumps 136) a pressurized first fluid and a pressurized second fluid into the high-pressure section 108 of the manifold assembly 104.

In some embodiments, the pressurized first fluid and the pressurized second fluid may be mixed with each other in the high-pressure section 108 of the manifold assembly 104 and/or at a region further downstream in the flow direction, e.g., which extends from the pumps 136 to the high-pressure section 108 of the manifold assembly 104, to form the fracturing fluid (e.g., a pressurized fracturing fluid). A continuous supply of the pressurized first fluid and the pressurized second fluid from the pumps 136 into the high-pressure section 108 of the manifold assembly 104 may push and supply the fracturing fluid into the well bore 102 such that the fracturing fluid may be further transmitted into the subterranean formation for performing the hydraulic fracturing operation at the various parts of the subterranean formation.

The first passage 116 of the low-pressure section 112 and the second passage 120 of the low-pressure section 112 may respectively receive the first fluid and the second fluid. The first passage 116 may be positioned towards the first pump set 136' and the second passage 120 may be positioned towards the second pump set 136", as exemplarily shown. As an example, the first passage 116 may define a first inlet end 156 (e.g., see FIGS. 4 and 5) and may receive an influx of the first fluid or the clean fluid via the first inlet end 156 (and accordingly may carry the first fluid), while the second passage 120 may define a second inlet end 160 (e.g., see FIGS. 4 and 5) and may receive an influx of the second fluid or the slurry via the second inlet end 160 (and accordingly may carry the second fluid) for the hydraulic fracturing operation. Fluid entering the first passage 116 may flow into the first passage 116 in and/or along a first flow direction (see direction, A, in FIGS. 4 and 5) and fluid entering the second passage 120 may flow into the second passage 120 in and/or along a second flow direction (see direction, B, in FIGS. 4 and 5).

Although not limited, the first passage 116 and the second passage 120 may be in the form of longitudinal channels or tubes. Also, in some embodiments, the second passage 120 may be parallel to the first passage 116. Further, in some embodiments, both the first passage 116 and the second passage 120 may be mounted onto a series of skids and/or onto one or more trailers (not shown), which may serve as a base for the manifold assembly 104 to be deployed over a surface of a worksite from where operations for hydraulic fracturing may be executed.

In some embodiments, each of the first passage 116 and the second passage 120 includes a number of side outlets to provide the first fluid (or the clean fluid) and the second fluid (or the slurry), respectively, to the low-pressure sides of the pumps 136 (e.g., to the first pump set 136' and to the second pump set 136"). Such side outlets may be serially arranged along each of the first passage 116 and the second passage 120 (e.g., along a length of each of the first passage 116 and the second passage 120). In this regard, see side outlets 164 provided on and along the first passage 116, and, similarly, see side outlets 168 provided on and along the second passage 120. Further, each of the first passage 116 and the second passage 120 may include multiple valves. For example, the first passage 116 may include first valves 172 and the second passage 120 may include second valves 176. The first valves 172 may be serially arranged along the first passage 116 (e.g., along a length of the first passage 116), and, similarly, the second valves 176 may be serially arranged along the second passage 120 (e.g., along a length of the second passage 120). Although not limited, both the first valves 172 and the second valves 176 may be butterfly valves, and may be similar in specification, function, and operation.

Figure 5:
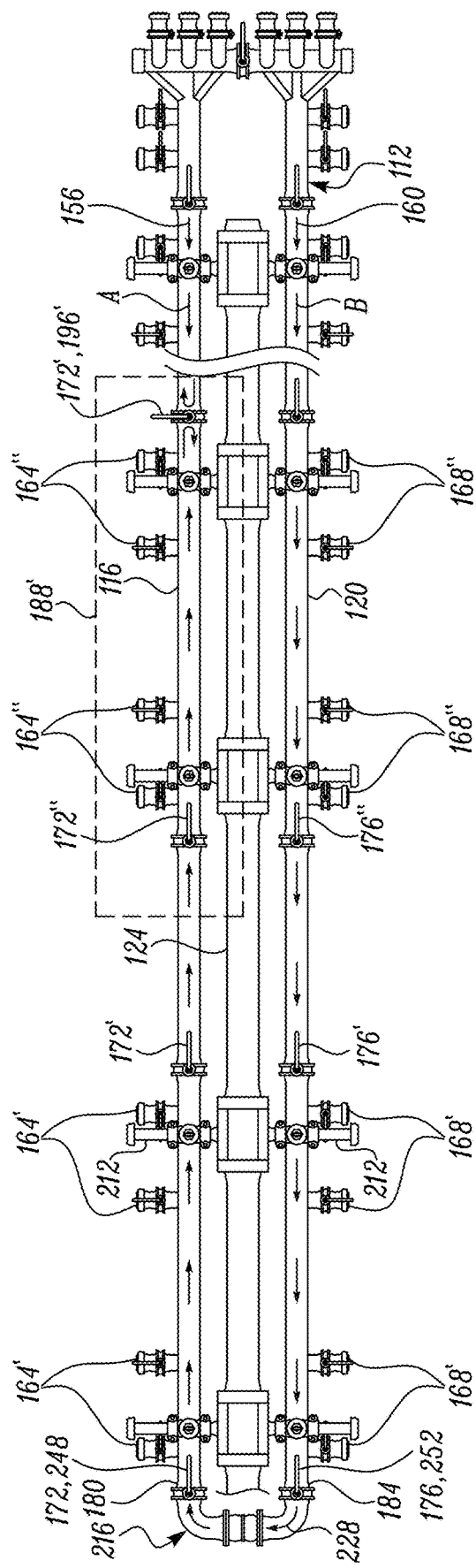

According to some embodiments, one or more of the first valves (e.g., two first valves 172, 172", as shown) may be positioned between first side outlets 164 and second side outlets 164" of the first passage 116—e.g., see FIG. 5. Although not limited, such a layout may be contemplated for the first passage 116 throughout the length of the first passage 116. Similarly, one or more of the second valves (e.g., two second valves 176, 176" as shown) may be positioned between third side outlets 168' and fourth side outlets 168" of the second passage 120. Although not limited, such a layout may be contemplated for the second passage 120 throughout the length of the second passage 120. Further, each of the first passage 116 and the second passage 120 may respectively define a first outlet end 180 (e.g., opposite to the first inlet end 156) and a second outlet end 184 (e.g., opposite to the second inlet end 160).

In some embodiments, multiple first stations (e.g., see a first station 188 in FIG. 2) may be serially defined on the first passage 116 and multiple second stations (e.g., see a second station 192 in FIG. 2) may be serially defined on the second passage 120. For the purpose of describing the first stations and the second stations, the first valves 172 of each first station 188 on the first passage 116 may be categorized into a first main splitter valve and a first auxiliary splitter valve. Therefore, each first station 188 arranged along the first passage 116 may include a first main splitter valve 196 and a first auxiliary splitter valve 200, as shown. Also, each first station 188 may include at least one side outlet (e.g., see side outlets 164) to provide an exit to the first fluid from the first passage 116. Similarly, the second valves 176 of each second station 192 on the second passage 120 may be categorized into a second main splitter valve and a second auxiliary splitter valve. Therefore, each second station 192 arranged along the second passage 120 may include a second main splitter valve 204 and a second auxiliary splitter valve 208, as shown. Also, each second station 192 may include at least one side outlet (e.g., see side outlets 168) to provide an exit to the second fluid from the second passage 120. Each of the first main splitter valve 196, the first auxiliary splitter valve 200, the second main splitter valve 204, and the second auxiliary splitter valve 208, is configured to be moved between a closed position to halt fluid flow therethrough and an open position to allow fluid flow therethrough.

The high-pressure section 108 of the manifold assembly 104 includes the third passage 124, as exemplarily noted above. The third passage 124 includes a number of side inlets 212 (see FIG. 2). The side inlets 212 may be provided on the first side 144 and the second side 148 and may be arranged serially on the third passage 124 to allow or ease a receipt the pressurized first fluid and pressurized second fluid from the first pump set 136' and the second pump set 136" into the third passage 124. Effectively, third passage 124 may receive the clean fluid and the slurry, respectively, from the high-pressure side 152 of the pumps 136, e.g., from the first pump set 136' and from the second pump set 136". In some embodiments, the third passage 124 may be parallel to each of the first passage 116 and/or the second passage 120.

Figure 6:
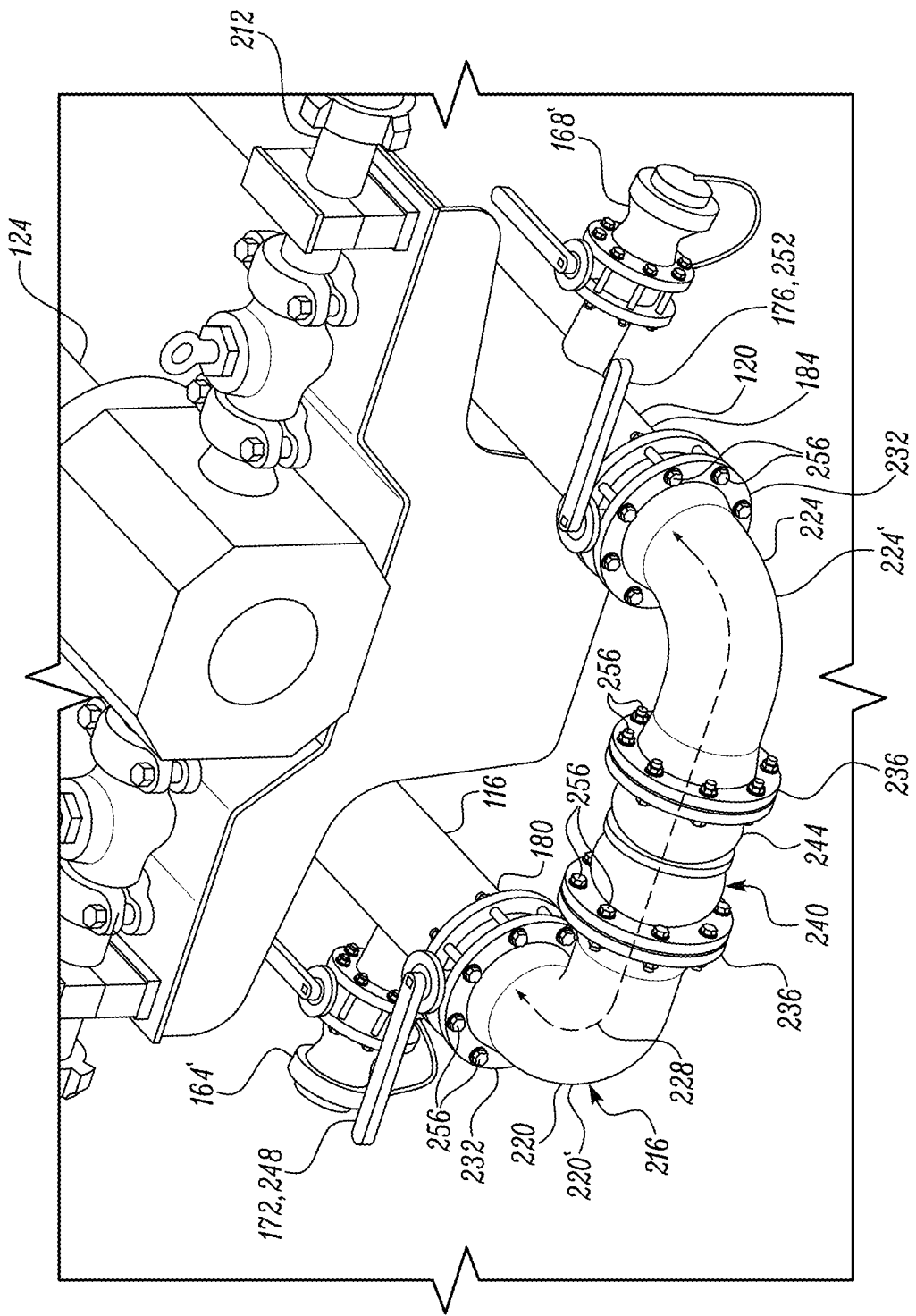
FIG. 6 is a close-up view of a flexible fluid coupler that enables the multiple passages to be fluidly coupled to each other, in accordance with an embodiment of the present disclosure.
Figure 7:
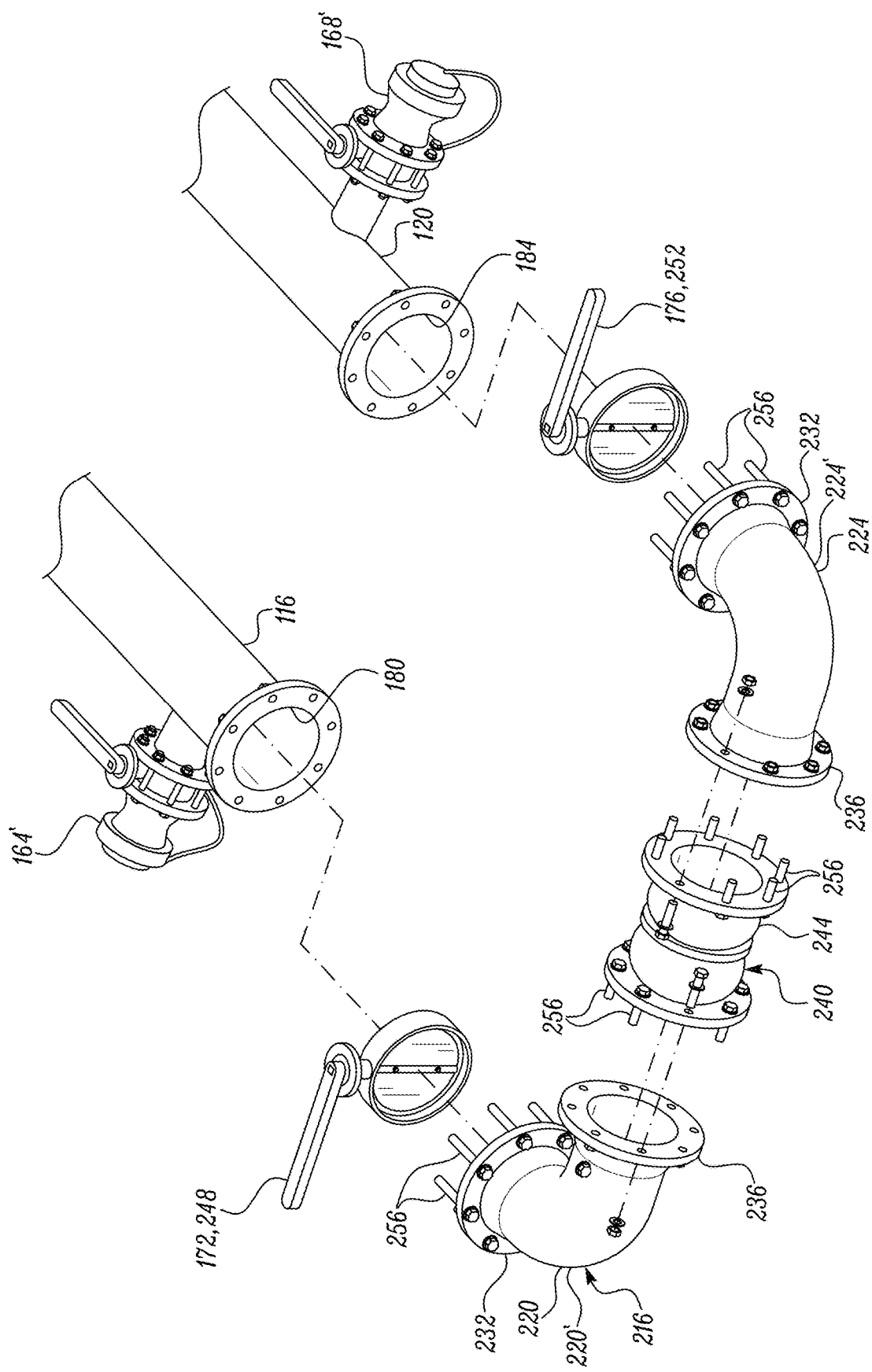
FIG. 7 is an exploded view of the flexible fluid coupler, in accordance with an embodiment of the present disclosure.
Figure 8:
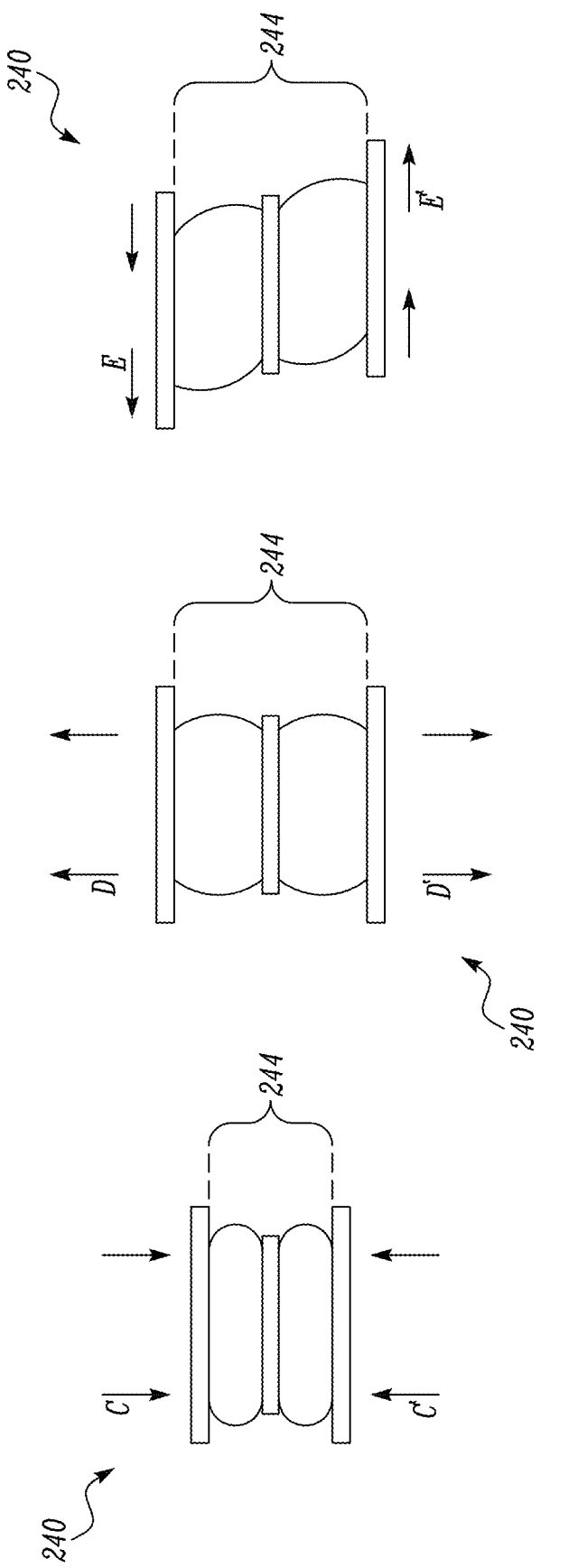
FIG. 8 are views illustrating a working of a flexible portion (or a flexible hose) of the flexible fluid coupler, in accordance with an embodiment of the present disclosure.

Referring now to FIGS. 6 through 8, and in conjunction with FIGS. 1 through 5, the manifold assembly 104 further includes a flexible fluid coupler, or simply, a fluid coupler 216, hereinafter. The fluid coupler 216 may include a first conduit 220 and a second conduit 224 and may define portions of a coupler passage 228 extending through the first conduit 220 and the second conduit 224. The fluid coupler 216 may be applied for fluidly coupling the first passage 116 and the second passage 120, e.g., by having the coupler passage 228 fluidly spanned between the first outlet end 180 of the first passage 116 and the second outlet end 184 of the second passage 120. In this regard, each of the first conduit 220 and the second conduit 224 may define a primary end 232 and a secondary end 236. The primary end 232 of the first conduit 220 may be connected (e.g., by using fasteners 256) (e.g., see FIG. 7) to the first passage 116 (e.g., the first outlet end 180 of the first passage 116) to selectively fluidly couple the first conduit 220 with the first passage 116. The primary end 232 of the second conduit 224 may be connected (e.g., by using fasteners 256) to the second passage 120 (e.g., to the second outlet end 184 of the second passage 120) to selectively fluidly couple the second conduit 224 with the second passage 120.

The fluid coupler 216 may also include a connector conduit 240 through which a part of the coupler passage 228 may be defined. The connector conduit 240 may be fluidly coupled (e.g., by using fasteners 256) between the first conduit 220 (e.g., the secondary end 236 of the first conduit 220) and the second conduit 224 (e.g., the secondary end 236 of the second conduit 224), as shown. In so doing, the coupler passage 228 may be defined by the first conduit 220, the second conduit 224, and by the connector conduit 240, collectively. Further, by way of its coupling with the first passage 116 and the second passage 120, the fluid coupler 216 may facilitate the first outlet end 180 of the first passage 116 to be coupled (e.g., fluidly coupled) to the second outlet end 184 of the second passage 120, or, in other words, the first outlet end 180 of the first passage 116 may be coupled (e.g., fluidly coupled) to the second outlet end 184 of the second passage 120 via the fluid coupler 216. Also, by way of such coupling, a continuous low-pressure passage may be defined (e.g., uninterruptedly) throughout the low-pressure section 112 of the manifold assembly 104 that starts from the first inlet end 156, moves across the first passage 116, moves across the coupler passage 228, and further moves across the second passage 120, and ends all the way at the second inlet end 160 (e.g., provided all the first valves 172 and the second valves 176 are in an open position to allow fluid flow therethrough).

In some embodiments, the connector conduit 240 may include a flexible hose or a flexible portion 244 that allows the connector conduit 240 to be flexed (e.g., pulled, pushed, stretched, panned, etc.) (see complementary directions, C-C", D-D', and E-E', in FIG. 8) in a variety of ways and in a variety of directions and/or orientations. In that manner, the flexible portion 244 may allow the connector conduit 240 to accommodate at least one of: variations in an alignment between the first passage 116 and the second passage 120, and/or differences in a position of the first conduit 220 with respect to a position of the second conduit 224, when the first conduit 220 and the second conduit 224 are respectively connected to the first passage 116 and the second passage 120. Also, a flexing of the flexible portion 244 accommodates variations in at least one of alignment or position of the first outlet end 180 (of the first passage 116) and the second outlet end 184 (of the second passage 120). Effectively, the fluid coupler 216 may be a 'flexible fluid coupler'.

Although not limited, the first conduit 220 and the second conduit 224 may include a rigid structure. As an example, each of the first conduit 220 and the second conduit 224 may be curved and/or may include an arcuate profile. Therefore, the first conduit 220 and the second conduit 224 may include a first rigid curved portion 220' and a second rigid curved portion 224, respectively. Further, once the fluid coupler 216 is assembled with the first passage 116 and the second passage 120, the first conduit 220 and the second conduit 224, together with the connector conduit 240, may impart a U-shaped profile to the fluid coupler 216, as shown in FIGS. 2 through 5.

While discussions above exemplarily iterate that the connector conduit 240 may be flexible, in some cases, the connector conduit 240 may be non-flexible. For example, the connector conduit 240 may alternatively be 'rigid' and/or 'fixed'. In such cases, the fluid coupler 216 may be referred to as a 'fixed fluid coupler' and/or a 'rigid fluid coupler'.

Further, in some embodiments, the connector conduit 240 may be altogether omitted from the fluid coupler 216. In such a case, the secondary end 236 of the first conduit 220 and the secondary end 236 of the second conduit 224 may be directly coupled (e.g., directly fluidly coupled) to each other to form the 'fixed fluid coupler' or the 'rigid fluid coupler'. In all such cases, it will be appreciated that the fluid coupler 216 may be applied to attain a continuously fluidly coupled state between the first passage 116 and the second passage 120 (for reference, see FIG. 3).

The fluid coupler 216 may further include a first coupler valve 248 (which may be exemplarily part of the first valves 172) and a second coupler valve 252 (which may be exemplarily part of the second valves 176). The first coupler valve 248 may be positioned between the first passage 116 (or between the first outlet end 180 of the first passage 116) and the primary end 232 of the first conduit 220. The second coupler valve 252 may be positioned between the second passage 120 (or between the second outlet end 184 of the second passage 120) and the primary end 232 of the second conduit 224. Effectively, the first coupler valve 248 may be positioned between the first outlet end 180 and the flexible fluid coupler (or just the fluid coupler 216) and the second coupler valve 252 may be positioned between the second outlet end 184 and the flexible fluid coupler (or just the fluid coupler 216).

Although not limited, both the first coupler valve 248 and the second coupler valve 252 may be butterfly valves and may be similar in specification, function, and operation. The first coupler valve 248 and the second coupler valve 252 may be movable between an open state and a closed state. In the open state, both the first coupler valve 248 and the second coupler valve 252 may allow fluid to pass therethrough, while in the closed state, both the first coupler valve 248 and the second coupler valve 252 may disallow fluid to pass therethrough. As an example, the first coupler valve 248 and the second coupler valve 252 may be similar and/or identical to the first valves 172 and the second valves 176.

In an open state of the first coupler valve 248 and the second coupler valve 252, therefore, a fluid coupling between the first passage 116 and the second passage 120 is established by the fluid coupler 216, and a transmission of one of the first fluid and the second fluid into at least a portion of the other of the first passage 116 and the second passage 120 is facilitated to selectively increase a quantity or a proportion of one of the first fluid or the second fluid within the fracturing fluid for the hydraulic fracturing operation. Conversely, in a closed state of the first coupler valve 248 and the second coupler valve 252, the fluid coupling between the first passage 116 and the second passage 120 is restricted by the fluid coupler 216, and the transmission of the first fluid or the second fluid between the first passage 116 and the second passage 120 is disallowed.

INDUSTRIAL APPLICABILITY

Figure 3:
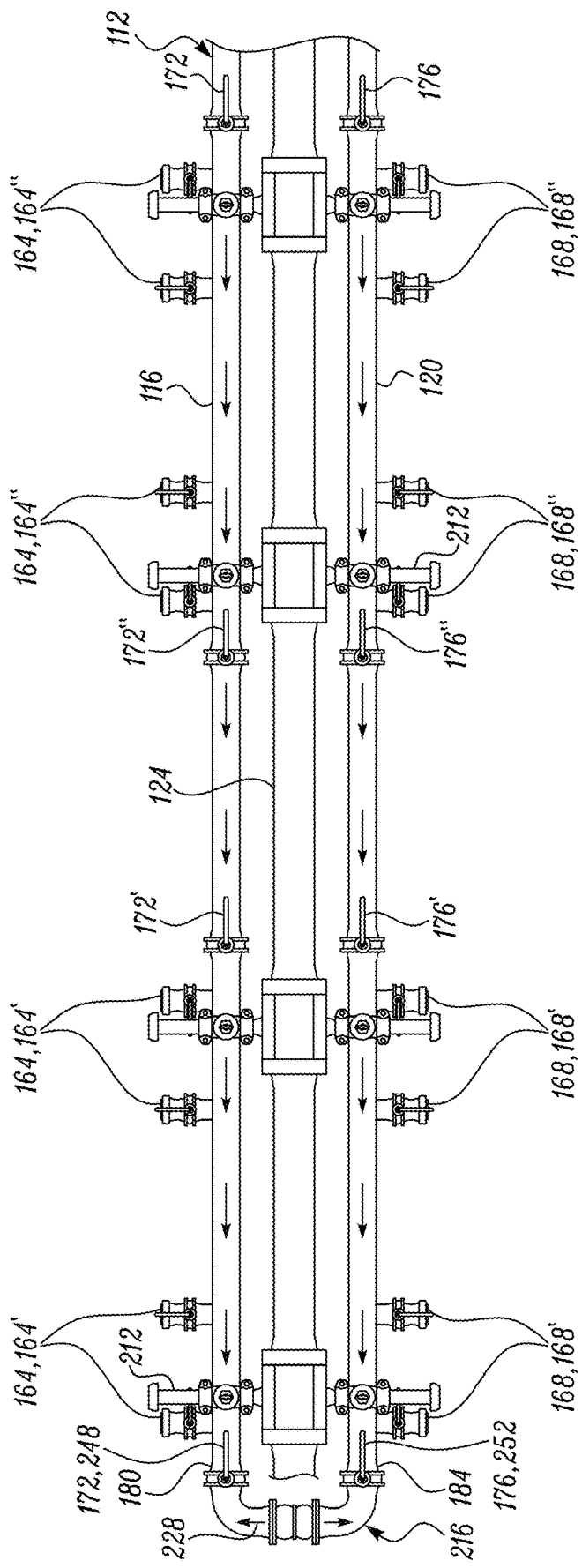
FIG. 3 is an exemplary view of a continuously fluidly coupled state of the low-pressure section in which multiple passages of the low-pressure section are fluidly coupled to each other, in accordance with an embodiment of the present disclosure.
Figure 4:
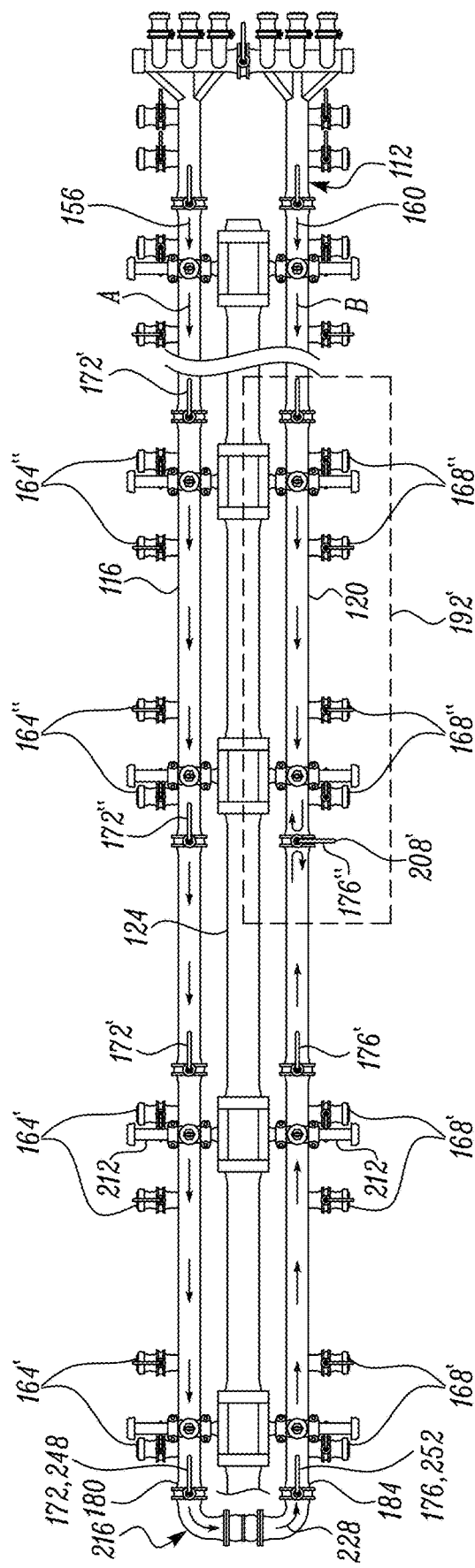
FIGS. 4 and 5 are various configurations of the fluidly coupled state of the multiple passages of the low-pressure section, in accordance with an embodiment of the present disclosure.

Referring to FIGS. 3, 4, and 5, during operations, and with relation to an exemplary method of performing a hydraulic fracturing operation, an operator may provide the manifold assembly 104, e.g., in the manner as has been described above. Also, the operator may couple (e.g., fluidly couple by using fasteners 256) the first conduit 220 to the first outlet end 180 of the first passage 116 and may couple (e.g., fluidly couple by using fasteners 256) the second conduit 224 to the second outlet end 184 of the second passage 120. Prior to, or after coupling the first conduit 220 to the first outlet end 180 and/or the second conduit 224 to the second outlet end 184, the operator may also couple (e.g., fluidly couple by using fasteners 256) the connector conduit 240 between the first conduit 220 and the second conduit 224.

Further, the operator may control, based on an open or closed position of the first valves 172 and the second valves 176, whether each side outlet 164, 168 of the first passage 116 and the second passage 120 is provided with clean fluid or slurry. In this regard, see FIG. 3 in which the first valves 172 (including the first coupler valve 248) and the second valves 176 (including the second coupler valve 252) are in the open position and/or in the open state. In such a case, the low-pressure section 112 of the manifold assembly 104 may either entirely include the first fluid, or may entirely include the second fluid, or may include a mixture of the first fluid and the second fluid.

In some examples, the operator may control, based on an open or closed state of the first coupler valve 248 and the second coupler valve 252, whether passage of the first fluid (e.g., clean fluid) or the second fluid (e.g., slurry) between the first passage 116 and the second passage 120, via the fluid coupler 216, is allowed or disallowed. More particularly, when at least one of the first coupler valve 248 or the second coupler valve 252 is in the closed state, passage of the first fluid (e.g., clean fluid) or the second fluid (e.g., slurry) between the first passage 116 and the second passage 120, via the fluid coupler 126, is disallowed. Conversely, when both of the first coupler valve 248 and the second coupler valve 252 are in the open state, passage of the first fluid (e.g., clean fluid) or the second fluid (e.g., slurry) between the first passage 116 and second passage 120, via the fluid coupler 216, is allowed.

In one scenario (e.g., in a first scenario of FIG. 4), controlling whether each side outlet 164, 168 is provided with the first fluid (e.g., clean fluid) or the second fluid (e.g., slurry) includes opening the first valves 172 and closing the second valves 176 (e.g., one of the second valves 176 such as the second auxiliary splitter valve 208') (see FIG. 4). Such control may be performed to cause clean fluid to be provided to at least the first and second side outlets (e.g., to all side outlets 164) of the first passage 116 via the first inlet end 156, cause the clean fluid to be provided to at least the third side outlet 168 of the second passage 120 (e.g., up to the last of the third side outlet 168 along the first flow direction, A), via the fluid coupler 216, and also cause slurry to be provided to at least the fourth side outlet 168" of the second passage 120 (e.g., up to the last fourth side outlet 168" along the second flow direction, B), via the second inlet end 160.

In such a case, and/or in the first scenario as shown in FIG. 4, in the open state of the first coupler valve 248 and the second coupler valve 252, the second fluid may enter into the second passage 120 through the second inlet end 160 in the second flow direction, B, and flow up to a last second station 192' along the second flow direction, B) on the second passage 120 where the second auxiliary splitter valve 208' is in the closed position, provided all (or any) second main splitter valve 204 and all (or any) second auxiliary splitter valve 208 lying in between the last second station 192 and the second inlet end 160 along the second passage 120 and along the second flow direction, B, are in the open position. Also, in such a case, the first fluid may enter into the first passage 116 through the first inlet end 156 in the first flow direction, A, to flow across the first passage 116, flow via the fluid coupler 216, and flow further into the second passage 120 up to the last second station 192 (where the second auxiliary splitter valve 208 is in the closed position), provided all (or any) first main splitter valve 196, second main splitter valves 204, first auxiliary splitter valve 200, and second auxiliary splitter valve 208, lying in between the last second station 192' and the first inlet end 156 and along the first passage 116 and the second passage 120 and along the first flow direction, A, are in the open position.

In another scenario (e.g., in a second scenario of FIG. 5), controlling whether each side outlet 164, 168 is provided with the first fluid (e.g., clean fluid) or the second fluid (e.g., slurry) includes closing the first valves 172 (e.g., one of the first valves 172 such as first main splitter valve 196') (see FIG. 5) and opening the second valves 176. Such control may be performed to cause clean fluid to be provided to at least one of the first side outlets 164 (exemplarily but specifically marked in FIG. 2) of the first passage 116, via the first inlet end 156, cause slurry to be provided to at least the second side outlet 164 of the first passage 116 (e.g., up to the last of the second side outlet 164" along the second flow direction, B), via the fluid coupler 216, and also cause slurry to be provided to at least the third and fourth side outlets 168 (e.g., to all third and fourth side outlets 168, 168) of the second passage 120, via the second inlet end 160.

In such a case, and/or in the second scenario as shown in FIG. 5, in the open state of the first coupler valve 248 and the second coupler valve 252, the first fluid may enter into the first passage 116 through the first inlet end 156 in the first flow direction, A, and flow up to a last first station 188 on the first passage 116 where the first main splitter valve 196' is in the closed position, provided all (or any) first main splitter valves 196 and all (or any) first auxiliary splitter valves 200 lying in between the last first station 188 and the first inlet end 156 along the first passage 116 and along the first flow direction, A, are in the open position. Also, in such a case, the second fluid may enter into the second passage 120 through the second inlet end 160 in the second flow direction, B, to flow across the second passage 120, flow via the fluid coupler 216, and flow further into the first passage 116 up to the last first station 188 (where the first main splitter valve 196' is in the closed position), provided all (or any) first main splitter valves 196, second main splitter valves 204, first auxiliary splitter valves 200, and second auxiliary splitter valves 208, lying in between the last first station 188' and the second inlet end 160 and along the second passage 120 and the first passage 116 and along the second flow direction, B, are in the open position.

Depending upon the first scenario or the second scenario, controlling whether each side outlet 164, 168 is provided with the first fluid (e.g., clean fluid) or the second fluid (e.g., slurry) selectively varies a portion of the first fluid (e.g., clean fluid) and the second fluid (e.g., slurry) that is pressurized by the pumps 136 and subsequently provided to the third passage 124. For example, in the first scenario, a proportion or quantity of the first fluid may be larger in the fracturing fluid as compared to a proportion or a quantity of the second fluid in the fracturing fluid. Conversely, in the second scenario, a proportion or quantity of the second fluid may be larger in the fracturing fluid as compared to a proportion or a quantity of the first fluid in the fracturing fluid. Multiple such scenarios may be contemplated by someone skilled in the art based on the present disclosure, and the first scenario and the second scenario may be viewed as examples.

The fluid coupler 216 allows the first fluid and the second fluid to be transmitted (e.g., freely transmitted when both the first coupler valve 248 and the second coupler valve 252 are in the open state and also both the first valves 172 and the second valves 176 are in the open position) (see FIG. 3), thus allowing the creation of a fluid loop (e.g., a continuous or uninterrupted fluid loop) between the first inlet end 156 and the second inlet end 160. Alternatively, when any one of the first valve 172 or the second valve 176 may be moved to the closed position, the quantity or proportion of the first fluid and the second fluid may be altered in the fracturing fluid. Effectively, the incorporation of the fluid coupler 216 in the hydraulic fracturing system 100 enhances workability between the first fluid and the second fluid, which in turn helps vary or alter a property (e.g., density, viscosity, and/or the like) of the fracturing fluid, as may be needed for the oil and gas extraction, with relative ease.

Incorporation of the fluid coupler 216 in the hydraulic fracturing system 100 particularly increases the flexibility to vary the quantity or proportion of the first fluid and the second fluid in the fracturing fluid at the low-pressure section 112 of the manifold assembly 104 much significantly as compared to a scenario where the fluid coupler 216 were absent and/or both the first outlet end 180 and the second outlet end 184 were blind ends or closed ends. Thus, a workability of the fracturing fluid formed by a split stream or by the dual fluids (e.g., the first fluid and the second fluid) for subterranean oil and gas extraction is markedly enhanced with the use of the fluid coupler 216, as the fluid coupler 216 helps negate the separation between the first fluid and second fluid in the low-pressure section 112 of the manifold assembly 104.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as examples only, with a true scope of the disclosure being indicated by the following claims and their equivalent.

What is claimed is:

1. A method for performing a hydraulic fracturing operation, the method comprising:
   providing a manifold assembly including:
   a low-pressure section that includes a first passage that receives a clean fluid via a first inlet end and a second passage, parallel to the first passage, that receives a slurry via a second inlet end,
   wherein each of the first passage and the second passage includes a plurality of side outlets configured to provide the clean fluid and the slurry, respectively, to a low-pressure section of a plurality of hydraulic fracturing pumps,
   wherein a first outlet end of the first passage is coupled to a second outlet end of the second passage via a flexible fluid coupler, and
   wherein a first valve is between first and second side outlets, of the plurality of side outlets of the first passage, and a second valve is between third and fourth side outlets, of the plurality of side outlets of the second passage; and
   a high-pressure section that includes a third passage with a plurality of side inlets that receive the clean fluid and the slurry, respectively, from a high-pressure section of the plurality of hydraulic fracturing pumps,
   wherein the third passage is parallel to the first passage and the second passage; and
   controlling, based on an open or closed position of the first valve and the second valve, whether each side outlet, of the plurality of side outlets of the first passage and the second passage, is provided with the clean fluid or the slurry.

2. The method of claim 1, wherein controlling whether each side outlet is provided with the clean fluid or the slurry includes:
   opening the first valve and closing the second valve to:
   cause the clean fluid to be provided to at least the first and second side outlets of the first passage, via the first inlet end,
   cause the clean fluid to be provided to at least the third side outlet of the second passage, via the flexible fluid coupler, and
   cause the slurry to be provided to at least the fourth side outlet of the second passage, via the second inlet end.

3. The method of claim 1, wherein controlling whether each side outlet is provided with the clean fluid or the slurry includes:
   closing the first valve and opening the second valve to:
   cause the clean fluid to be provided to at least the first side outlet of the first passage, via the first inlet end,
   cause the slurry to be provided to at least the second side outlet of the first passage, via the flexible fluid coupler, and
   cause the slurry to be provided to at least the third and fourth side outlets of the second passage, via the second inlet end.

4. The method of claim 1, wherein controlling whether each side outlet is provided with the clean fluid or the slurry selectively varies a portion of the clean fluid and the slurry that is pressurized by the plurality of hydraulic fracturing pumps and subsequently provided to the third passage.

5. The method of claim 1, wherein the manifold assembly includes a first coupler valve between the first outlet end and the flexible fluid coupler and a second coupler valve between the second outlet end and the flexible fluid coupler, the method further comprising:
   controlling, based on an open or closed state of the first coupler valve and the second coupler valve, whether passage of the clean fluid or the slurry between the first passage and the second passage, via the flexible fluid coupler, is allowed or disallowed.

6. The method of claim 5, wherein, when at least one of the first or second coupler valves is closed, passage of the clean fluid or the slurry between the first passage and the second passage, via the flexible fluid coupler, is disallowed.

7. The method of claim 5, wherein, when both of the first coupler valve and the second coupler valve are opened, passage of the clean fluid or the slurry between the first passage and the second passage, via the flexible fluid coupler, is allowed.

8. The method of claim 1, wherein the flexible fluid coupler includes a first rigid curved portion, a second rigid curved portion, and a flexible portion coupled between the first rigid curved portion and the second rigid curved portion, the method further comprising:
coupling the first rigid curved portion to the first outlet end; and
coupling the second rigid curved portion to the second outlet end, wherein flexing of the flexible portion of the flexible fluid coupler is configured to accommodate variations in at least one of alignment or position of the first outlet end and the second outlet end.

9. A fluid coupler for fluidly coupling a first passage and a second passage respectively carrying a first fluid and a second fluid for a hydraulic fracturing operation, the fluid coupler comprising:
a first conduit and a second conduit, each of the first conduit and the second conduit defining a primary end and a secondary end, the primary end of the first conduit configured to be connected to the first passage to selectively fluidly couple the first conduit with the first passage, the primary end of the second conduit configured to be connected to the second passage to selectively fluidly couple the second conduit with the second passage;
a connector conduit fluidly coupled between the secondary end of the first conduit and the secondary end of the second conduit;
a first coupler valve positionable between the first passage and the primary end of the first conduit; and
a second coupler valve positionable between the second passage and the primary end of the second conduit, wherein, in an open state of the first coupler valve and the second coupler valve,
fluid coupling between the first passage and the second passage is established by the fluid coupler, and
a transmission of one of the first fluid and the second fluid into at least a portion of the other of the first passage and the second passage is facilitated to selectively increase a quantity or a proportion of one of the first fluid or the second fluid within a fracturing fluid for the hydraulic fracturing operation.

10. The fluid coupler of claim 9, wherein, in a closed state of the first coupler valve and the second coupler valve,
fluid coupling between the first passage and the second passage is restricted by the fluid coupler, and
the transmission of the first fluid or the second fluid between the first passage and the second passage is disallowed.

11. The fluid coupler of claim 9, wherein
the first coupler valve and the second coupler valve are butterfly valves, and
the first conduit and the second conduit each includes an arcuate profile, and together with the connector conduit, impart a U-shaped profile to the fluid coupler.

12. The fluid coupler of claim 9, wherein the connector conduit includes a flexible portion to accommodate at least one of:
variations in an alignment between the first passage and the second passage, and
differences in a position of the first conduit with respect to a position of the second conduit, when the first conduit and the second conduit are respectively connected to the first passage and the second passage.

13. A manifold assembly for a hydraulic fracturing system, the manifold assembly comprising:
a high-pressure section;
a low-pressure section including a first passage and a second passage respectively carrying a first fluid and a second fluid, each of first fluid and the second fluid configured to be pumped into the high-pressure section to form a fracturing fluid, the fracturing fluid suppliable into a well bore for performing a hydraulic fracturing operation;
a fluid coupler for fluidly coupling the first passage and the second passage, the fluid coupler including:
a first conduit and a second conduit, each of the first conduit and the second conduit defining a primary end and a secondary end, the primary end of the first conduit connected to the first passage to selectively fluidly couple the first conduit with the first passage, the primary end of the second conduit connected to the second passage to selectively fluidly couple the second conduit with the second passage;
a connector conduit fluidly coupled between the secondary end of the first conduit and the secondary end of the second conduit;
a first coupler valve positioned between the first passage and the primary end of the first conduit; and
a second coupler valve positioned between the second passage and the primary end of the second conduit, wherein, in an open state of the first coupler valve and the second coupler valve,
fluid coupling between the first passage and the second passage is established by the fluid coupler, and
a transmission of one of the first fluid and the second fluid into at least a portion of the other of the first passage and the second passage is facilitated to selectively increase a quantity or a proportion of one of the first fluid or the second fluid within the fracturing fluid for the hydraulic fracturing operation.

14. The manifold assembly of claim 13, wherein, in a closed state of the first coupler valve and the second coupler valve,
fluid coupling between the first passage and the second passage is restricted by the fluid coupler, and
the transmission of the first fluid or the second fluid between the first passage and the second passage is disallowed.

15. The manifold assembly of claim 13, wherein
the second fluid is different from the first fluid,
the first passage and the second passage are parallel to each other, the first coupler valve and the second coupler valve are butterfly valves, and
the first conduit and the second conduit each includes an arcuate profile, and together with the connector conduit, impart a U-shaped profile to the fluid coupler.

16. The manifold assembly of claim 13, wherein the connector conduit includes a flexible portion to accommodate at least one of:
variations in an alignment between the first passage and the second passage, and
differences in a position of the first conduit with respect to a position of the second conduit, when the first conduit and the second conduit are respectively connected to the first passage and the second passage.

17. The manifold assembly of claim 13, wherein
the first passage defines a first inlet end to allow an influx of the first fluid into the first passage, a plurality of first stations being serially defined on the first passage, and
the second passage defines a second inlet end to allow an influx of the second fluid into the second passage, a plurality of second stations being serially arranged on the second passage.

18. The manifold assembly of claim 17, wherein
each first station of the plurality of first stations arranged along the first passage includes a first main splitter valve, a first auxiliary splitter valve, and at least one side outlet to provide an exit to the first fluid from the first passage,
each second station of the plurality of second stations arranged along the second passage includes a second main splitter valve, a second auxiliary splitter valve, and at least one side outlet to provide an exit to the second fluid from the second passage, and
each of the first main splitter valve, the first auxiliary splitter valve, the second main splitter valve, and the second auxiliary splitter valve, is configured to be moved between a closed position to halt fluid flow therethrough and an open position to allow fluid flow therethrough.

19. The manifold assembly of claim 18, wherein, in the open state of the first coupler valve and the second coupler valve,
the first fluid is configured to enter into the first passage through the first inlet end in a first flow direction and flow up to a last first station on the first passage where the first main splitter valve is in the closed position, provided all first main splitter valves and all first auxiliary splitter valves lying in between the last first station and the first inlet end along the first passage and along the first flow direction are in the open position, and
the second fluid is configured to enter into the second passage through the second inlet end in a second flow direction to flow across the second passage, flow via the fluid coupler, and flow further into the first passage up to the last first station, provided all first main splitter valves, second main splitter valves, first auxiliary splitter valves, and second auxiliary splitter valves, lying in between the last first station and the second inlet end and along the second passage and the first passage and along the second flow direction are in the open position.

20. The manifold assembly of claim 18, wherein, in the open state of the first coupler valve and the second coupler valve,
the second fluid is configured to enter into the second passage through the second inlet end in a second flow direction and flow up to a last second station on the second passage where the second auxiliary splitter valve is in the closed position, provided all second main splitter valves and all second auxiliary splitter valves lying in between the last second station and the second inlet end along the second passage and along the second flow direction are in the open position, and
the first fluid is configured to enter into the first passage through the first inlet end in a first flow direction to flow across the first passage, flow via the fluid coupler, and flow further into the second passage up to the last second station, provided all first main splitter valves, second main splitter valves, first auxiliary splitter valves, and second auxiliary splitter valves, lying in between the last second station and the first inlet end and along the first passage and the second passage and along the first flow direction are in the open position.

* * * * *